(12) United States Patent
Nelson et al.

(10) Patent No.: US 12,516,309 B2
(45) Date of Patent: Jan. 6, 2026

(54) METHOD OF TREATING INFECTIONS BY BACTERIOLYTIC ENZYMES AND MANUFACTURE THEREOF

(71) Applicant: UNIVERSITY OF MARYLAND, COLLEGE PARK, College Park, MD (US)

(72) Inventors: Daniel C. Nelson, Rockville, MD (US); Sara Beth Linden, Bethesda, MD (US); Niels Vander Elst, Ghent (BE)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 673 days.

(21) Appl. No.: 17/773,533

(22) PCT Filed: Oct. 31, 2020

(86) PCT No.: PCT/US2020/058437
§ 371 (c)(1),
(2) Date: Apr. 29, 2022

(87) PCT Pub. No.: WO2021/087415
PCT Pub. Date: May 6, 2021

(65) Prior Publication Data
US 2022/0380744 A1    Dec. 1, 2022

Related U.S. Application Data

(60) Provisional application No. 62/928,764, filed on Oct. 31, 2019.

(51) Int. Cl.
*C12N 9/80* (2006.01)
*A61K 38/47* (2006.01)
*A61P 17/10* (2006.01)

(52) U.S. Cl.
CPC ............... *C12N 9/80* (2013.01); *A61K 38/47* (2013.01); *A61P 17/10* (2018.01)

(58) Field of Classification Search
CPC ............ C12N 9/80; A61P 17/10; A61K 38/47
See application file for complete search history.

(56) References Cited

U.S. PATENT DOCUMENTS

| 11,136,570 B2 * | 10/2021 | Miller ..................... A61P 31/04 |
| 2015/0086581 A1 | 3/2015 | Li et al. |
| 2016/0145591 A1 * | 5/2016 | Resch .................... A61K 38/47 435/200 |

OTHER PUBLICATIONS

Brzuszkiewicz E, Weiner J, Wollherr A, Thürmer A, Hupeden J, Lomholt HB, Kilian M, Gottschalk G, Daniel R, Mollenkopf HJ, Meyer TF, Brüggemann H. Comparative genomics and transcriptomics of Propionibacterium acnes. PLoS One. 2011;6(6):e21581. doi: 10.1371/journal.pone.0021581. (Year: 2011).*

(Continued)

*Primary Examiner* — Louise W Humphrey
*Assistant Examiner* — Rachel Emily Martin
(74) *Attorney, Agent, or Firm* — HULTQUIST, PLLC; Steven J. Hultquist

(57) ABSTRACT

A method of treating or preventing *P. acnes* and/or *S. aureus* infection is described, involving contacting *P. acnes* and/or *S. aureus*, or a physiological locus infected or susceptible to infection by *P. acnes* and/or *S. aureus*, with at least one of specified bacteriolytic agents. Corresponding pharmaceutical compositions containing such bacteriolytic agents are described, which are useful for treatment or prophylaxis of acne vulgaris and/or *S. aureus* infection, including methicillin-resistant *S. aureus* infection.

7 Claims, 3 Drawing Sheets
Specification includes a Sequence Listing.

(56) References Cited

OTHER PUBLICATIONS

Nelson MU, et al., Clinical and Molecular Epidemiology of Methicillin-Resistant *Staphylococcus aureus* in a Neonatal Intensive Care Unit in the Decade following Implementation of an Active Detection and Isolation Program. J Clin Microbiol. Aug. 2015;53(8):2492-501. doi: 10.1128/JCM.00470-15. (Year: 2015).*
NCBI accession YP_006906916.1. htttps://www.ncbi.nlm.nih.gov/protein/410491694?sat=46&satkey=163032797 (Year: 2012).*
UniProt ID A0A4D6BA42_9CAUD. htttps://www.uniprot.org/uniprotkb/A0A4D6BA42/entry (Year: 2019).*
Matysiak-Jonczyk, E., et al., "Prospects of Phage Application in the Treatment of Acne Caused by Propionibacterium acnes", Frontiers in Microbiology, 2017, pp. 1-11, vol. 8, No. 164, Publisher: www.frontiersin.org.
UniProt K4HN50, "Putative endolysin", 2019, Page(s) http://www.uniprot.org/uniprot/K4HN50.txt?version=20.

* cited by examiner

PlyT100

PlySs9

SEQUENCE LISTING

<160> NUMBER OF SEQ ID NOS: 11

<210> SEQ ID NO 1
<211> LENGTH: 855
<212> TYPE: DNA
<213> ORGANISM: Artificial Sequence
<220> FEATURE:
<223> OTHER INFORMATION: Synthetic construct

<400> SEQUENCE: 1

```
gtgagataca ttccagcagc gcaccattcg gccggctcta atcatccggt gaatagggtt      60
gtgattcatg cgacatgccc ggatgtgggg tttccgtccg cctcccgtaa agggcgtgct     120
gtttctacag caaactattt tgcttcccca tcatcggggg gttcggctca ttatgtgtgt     180
gatattgggg agacggtgca gtgcctgtcc gagggcacta ttggctggca tgccccgcct     240
aatccgcaca gcctgggtat agagatttgc gccgatgggg gttcgcacgc ctcgttccgg     300
gtgccagggc atgcttacac gagggagcag tggctggatc ctcgcgtgtg gcctgcggtg     360
gagaaggctg ccatcctgtg tagacgtttg tgtgacaaat ataatgttcc aaagaggaag     420
cttagtgcag ccgatttgaa ggctggcagg cggggtgtgt gcgggcatgt ggatgttacg     480
gatgcgtggc atcagtcgga tcatgacgat ccggggccgt ggtttccgtg ggacaggttt     540
atggccgttg tcaacggtca caatgagagt ggggagttaa ctgtggctga tgtgaaagcc     600
ttgcatgatc agattaaaca attgtctgcg cagcttgccg gttcggtgaa taagctgcac     660
cacgatgttg gtgtagtgca ggtgcagaat ggtgacctgg gtaagcgtgt ggatgccctg     720
tcgtgggtga agaatccggt gaccgggaag ctgtggcgca ccaaggacgc cctgtggagt     780
gtctggtatt acgtgctgga gtgtcgtagc cgtattgaca ggcttgagtc tgctgttaac     840
ggtttaaaaa agtga                                                      855
```

<210> SEQ ID NO 2
<211> LENGTH: 855
<212> TYPE: DNA
<213> ORGANISM: Artificial Sequence
<220> FEATURE:
<223> OTHER INFORMATION: Synthetic construct

<400> SEQUENCE: 2

```
atgcgttata ttccggcagc acatcattca gcaggtagca atcatccggt taatcgtgtt      60
gttattcatg caacctgtcc ggatgttggt tttccgagcg caagccgtaa aggtcgtgca     120
gttagcaccg caaactattt tgcaagcccg agcagcggtg gtagcgcaca ttatgtttgt     180
gatattggtg aaaccgttca gtgtctgagc gaaggcacca ttggttggca tgcaccgcct     240
```

-continued

```
aatccgcata gcctgggtat tgaaatttgt gcagatggtg gtagccatgc aagctttcgt    300
gttccgggtc atgcatatac ccgtgaacag tggctggatc cgcgtgtttg gcctgcagtt    360
gaaaaagcag caattctgtg tcgtcgtctg tgcgataaat acaatgttcc gaaacgtaaa    420
ctgagcgcag cagatctgaa agcaggtcgt cgtggtgttt gtggtcatgt tgatgttacc    480
gatgcatggc atcagagcga tcatgatgat ccgggtccgt ggtttccgtg ggatcgtttt    540
atggcagttt ttaatggtca taacgaaagc ggtgaactga ccgttgcaga tgttaaagca    600
ctgcatgatc agattaaaca gctgagtgca cagctggcag gtagcgttaa taaactgcat    660
cacgatgttg gtgttgttca ggttcagaat ggtgatctgg gtaaacgtgt tgatgcactg    720
agctgggtta aaaatccggt gaccggtaaa ctgtggcgta ccaaagatgc actgtggtca    780
gtttggtatt atgttctgga atgtcgtagc cgtattgatc gtctggaaag cgcagtgaat    840
ggtctgaaaa aataa                                                     855
```

<210> SEQ ID NO 3
<211> LENGTH: 284
<212> TYPE: PRT
<213> ORGANISM: Artificial Sequence
<220> FEATURE:
<223> OTHER INFORMATION: Synthetic construct

<400> SEQUENCE: 3

```
Val Arg Tyr Ile Pro Ala Ala His His Ser Ala Gly Ser Asn His Pro
1               5                   10                  15

Val Asn Arg Val Val Ile His Ala Thr Cys Pro Asp Val Gly Phe Pro
                20                  25                  30

Ser Ala Ser Arg Lys Gly Arg Ala Val Ser Thr Ala Asn Tyr Phe Ala
            35                  40                  45

Ser Pro Ser Ser Gly Gly Ser Ala His Tyr Val Cys Asp Ile Gly Glu
        50                  55                  60

Thr Val Gln Cys Leu Ser Glu Gly Thr Ile Gly Trp His Ala Pro Pro
65                  70                  75                  80

Asn Pro His Ser Leu Gly Ile Glu Ile Cys Ala Asp Gly Ser His
                85                  90                  95

Ala Ser Phe Arg Val Pro Gly His Ala Tyr Thr Arg Glu Gln Trp Leu
            100                 105                 110

Asp Pro Arg Val Trp Pro Ala Val Glu Lys Ala Ala Ile Leu Cys Arg
        115                 120                 125

Arg Leu Cys Asp Lys Tyr Asn Val Pro Lys Arg Lys Leu Ser Ala Ala
    130                 135                 140

Asp Leu Lys Ala Gly Arg Arg Gly Val Cys Gly His Val Asp Val Thr
145                 150                 155                 160

Asp Ala Trp His Gln Ser Asp His Asp Asp Pro Gly Pro Trp Phe Pro
                165                 170                 175

Trp Asp Arg Phe Met Ala Val Val Asn Gly His Asn Glu Ser Gly Glu
            180                 185                 190

Leu Thr Val Ala Asp Val Lys Ala Leu His Asp Gln Ile Lys Gln Leu
        195                 200                 205

Ser Ala Gln Leu Ala Gly Ser Val Asn Lys Leu His His Asp Val Gly
    210                 215                 220

Val Val Gln Val Gln Asn Gly Asp Leu Gly Lys Arg Val Asp Ala Leu
225                 230                 235                 240

Ser Trp Val Lys Asn Pro Val Thr Gly Lys Leu Trp Arg Thr Lys Asp
                245                 250                 255
```

```
Ala Leu Trp Ser Val Trp Tyr Tyr Val Leu Glu Cys Arg Ser Arg Ile
        260                 265                 270

Asp Arg Leu Glu Ser Ala Val Asn Gly Leu Lys Lys
        275                 280
```

<210> SEQ ID NO 4
<211> LENGTH: 284
<212> TYPE: PRT
<213> ORGANISM: Artificial Sequence
<220> FEATURE:
<223> OTHER INFORMATION: Synthetic construct

<400> SEQUENCE: 4

```
Met Arg Tyr Ile Pro Ala Ala His His Ser Ala Gly Ser Asn His Pro
1               5                   10                  15

Val Asn Arg Val Val Ile His Ala Thr Cys Pro Asp Val Gly Phe Pro
            20                  25                  30

Ser Ala Ser Arg Lys Gly Arg Ala Val Ser Thr Ala Asn Tyr Phe Ala
        35                  40                  45

Ser Pro Ser Gly Gly Ser Ala His Tyr Val Cys Asp Ile Gly Glu
    50                  55                  60

Thr Val Gln Cys Leu Ser Glu Gly Thr Ile Gly Trp His Ala Pro Pro
65                  70                  75                  80

Asn Pro His Ser Leu Gly Ile Glu Ile Cys Ala Asp Gly Gly Ser His
                85                  90                  95

Ala Ser Phe Arg Val Pro Gly His Ala Tyr Thr Arg Glu Gln Trp Leu
            100                 105                 110

Asp Pro Arg Val Trp Pro Ala Val Glu Lys Ala Ala Ile Leu Cys Arg
        115                 120                 125

Arg Leu Cys Asp Lys Tyr Asn Val Pro Lys Arg Lys Leu Ser Ala Ala
    130                 135                 140

Asp Leu Lys Ala Gly Arg Arg Gly Val Cys Gly His Val Asp Val Thr
145                 150                 155                 160

Asp Ala Trp His Gln Ser Asp His Asp Pro Gly Pro Trp Phe Pro
                165                 170                 175

Trp Asp Arg Phe Met Ala Val Val Asn Gly His Asn Glu Ser Gly Glu
            180                 185                 190

Leu Thr Val Ala Asp Val Lys Ala Leu His Asp Gln Ile Lys Gln Leu
        195                 200                 205

Ser Ala Gln Leu Ala Gly Ser Val Asn Lys Leu His His Asp Val Gly
    210                 215                 220

Val Val Gln Val Gln Asn Gly Asp Leu Gly Lys Arg Val Asp Ala Leu
225                 230                 235                 240

Ser Trp Val Lys Asn Pro Val Thr Gly Lys Leu Trp Arg Thr Lys Asp
                245                 250                 255

Ala Leu Trp Ser Val Trp Tyr Tyr Val Leu Glu Cys Arg Ser Arg Ile
            260                 265                 270

Asp Arg Leu Glu Ser Ala Val Asn Gly Leu Lys Lys
        275                 280
```

<210> SEQ ID NO 5
<211> LENGTH: 534
<212> TYPE: DNA
<213> ORGANISM: Artificial Sequence
<220> FEATURE:
<223> OTHER INFORMATION: Synthetic construct

<400> SEQUENCE: 5

```
atggcaggta gcaatcatcc ggttaatcgt gttgttattc atgcaacctg tccggatgtt      60
ggttttccga gcgcaagccg taaaggtcgt gcagttagca ccgcaaacta ttttgcaagc     120
ccgagcagcg gtggtagcgc acattatgtt tgtgatattg gtgaaaccgt tcagtgtctg     180
agcgaaggca ccattggttg gcatgcaccg cctaatccgc atagcctggg tattgaaatt     240
tgtgcagatg gtggtagcca tgcaagcttt cgtgttccgg gtcatgcata tacccgtgaa     300
cagtggctgg atccgcgtgt ttggcctgca gttgaaaaag cagcaattct gtgtcgtcgt     360
ctgtgcgata atacaatgt tccgaaacgt aaactgagcg cagcagatct gaaagcaggt     420
cgtcgtggtg tttgtggtca tgttgatgtt accgatgcat ggcatcagag cgatcatgat     480
gatcctggtc cgtggtttcc gtgggatcgt tttatggcag ttgttaatgg ttaa           534
```

<210> SEQ ID NO 6
<211> LENGTH: 177
<212> TYPE: PRT
<213> ORGANISM: Artificial Sequence
<220> FEATURE:
<223> OTHER INFORMATION: Synthetic construct

<400> SEQUENCE: 6

```
Met Ala Gly Ser Asn His Pro Val Asn Arg Val Val Ile His Ala Thr
  1               5                  10                  15
Cys Pro Asp Val Gly Phe Pro Ser Ala Ser Arg Lys Gly Arg Ala Val
                 20                  25                  30
Ser Thr Ala Asn Tyr Phe Ala Ser Pro Ser Ser Gly Gly Ser Ala His
             35                  40                  45
Tyr Val Cys Asp Ile Gly Glu Thr Val Gln Cys Leu Ser Glu Gly Thr
         50                  55                  60
Ile Gly Trp His Ala Pro Pro Asn Pro His Ser Leu Gly Ile Glu Ile
 65                  70                  75                  80
Cys Ala Asp Gly Gly Ser His Ala Ser Phe Arg Val Pro Gly His Ala
                 85                  90                  95
Tyr Thr Arg Glu Gln Trp Leu Asp Pro Arg Val Trp Pro Ala Val Glu
            100                 105                 110
Lys Ala Ala Ile Leu Cys Arg Arg Leu Cys Asp Lys Tyr Asn Val Pro
        115                 120                 125
Lys Arg Lys Leu Ser Ala Ala Asp Leu Lys Ala Gly Arg Arg Gly Val
    130                 135                 140
Cys Gly His Val Asp Val Thr Asp Ala Trp His Gln Ser Asp His Asp
145                 150                 155                 160
Asp Pro Gly Pro Trp Phe Pro Trp Asp Arg Phe Met Ala Val Val Asn
                165                 170                 175
Gly
```

<210> SEQ ID NO 7
<211> LENGTH: 1470
<212> TYPE: DNA
<213> ORGANISM: Artificial Sequence
<220> FEATURE:
<223> OTHER INFORMATION: Synthetic construct

<400> SEQUENCE: 7

```
atgggaaaac atctagtcat ttgtggtcat gggcaagggc aacaggcta tgatcctgga      60
gcagtgaatg ccaaactagg catcacagaa gctggaaagg ttcgagaatt atccaagtta     120
```

| | |
|---|---|
| atgtccaagt acagtggaca acagattgat tttattaccg aacaaaatgt ttatgattat | 180 |
| cggagtatta ctagtattgg taagggatac gactcaatta ctgaattgca cttcaatgcc | 240 |
| tttaatggta gtgccaaagg tacagaagtc ttgattcaat cttctttaga agcagacaag | 300 |
| gaggatatgg ctatcctatc tctcctttca cgatactttc aaaatcgtgg cataaagaag | 360 |
| gtagattggc tctataatgc caaccaagca gcgagtcgtg gatataccta tcgtttggtg | 420 |
| gagattgcct ttatcgataa tgaacaagat atggcgattt tgaaaacaa gaaagaggac | 480 |
| attgcgaaag tcttgtgtc agcaataaca ggagttgaag tcaagacaat agttccctcg | 540 |
| cccccccagtt caactgttgg gagttcaggt actccttcaa aatcaatcta tcttgttggt | 600 |
| gatagtctta gggtgttgcc tcatgcgact cattatcaga ctggtcagaa aattgccaac | 660 |
| tgggtcaaag gcgcaccta caaaatcctc caagtgaaga atgttcacca gtccaacagt | 720 |
| aagagagctt atctacttga tggaatcaag tcatgggtgc tagagcagga tgtagaagga | 780 |
| acaaccaaag gccatagtga gcagacctat caagcacaga aaggcgatac gtattatgga | 840 |
| atcgctcgga agtttggtct atcagtagat acccttcttg tagtgaatgg tttgaagaag | 900 |
| tcggatatac tgaaagttgg acaaacactc aaggttaacg ctgcttcaag gacaacaact | 960 |
| gctattccaa ctagcgttgc aagccgtgtg gttgcgtcag ctttatctaa ggtcggtcaa | 1020 |
| aaggtgaccg ttccatctaa tccttatggt gggcagtgtg ttgccttggt ggataagatt | 1080 |
| gttcaagaac ttacgacaa gaatatgtcc tatactaatg ccattgattg tttgaagaaa | 1140 |
| gcaaaatcaa atggtttcca gtaatctac gatgcttggg gtgtaaatcc taaagcaggt | 1200 |
| gatttttatg tcattcaaac agatggtatg gtttacgggc atattggtgt ctgtgtgacg | 1260 |
| gattctgatg gaaaaagtat tgatggtgtg aacagaata ttgatggata ttctgaccat | 1320 |
| aataataacg gtatcaatga ccaattagaa attggtggcg gtggaattac tcgtcgtgtg | 1380 |
| aaacggcaat ggatggcgaa tggctcactc tatgattcta ctggaacagt taaacttgga | 1440 |
| aaagttgttg gttggtttag aatttcataa | 1470 |

<210> SEQ ID NO 8
<211> LENGTH: 1470
<212> TYPE: DNA
<213> ORGANISM: Artificial Sequence
<220> FEATURE:
<223> OTHER INFORMATION: Synthetic construct

<400> SEQUENCE: 8

| | |
|---|---|
| atgggcaaac atctggtgat tgtggtcat ggtcagggtc gtaccggtta tgatccgggt | 60 |
| gcagttaatg caaaactggg tattaccgaa gcaggtaaag ttcgtgaact gagcaaactg | 120 |
| atgagcaaat atagcggtca gcagatcgat tttatcaccg aacagaacgt gtatgattat | 180 |
| cgtagcatta ccagcattgg taaaggctat gacagcatta ccgaactgca ttttaatgcc | 240 |
| tttaatggta gcgcaaaagg caccgaagtt ctgattcaga gcagcctgga agcagataaa | 300 |
| gaagatatgg caattctgag cctgctgagc cgttattttc agaatcgtgg tatcaaaaaa | 360 |
| gtggattggc tgtataatgc aaatcaggca gcaagccgtg gttataccta tcgtctggtt | 420 |
| gaaattgcct tcatcgataa cgaacaggat atggccatct tgaaaacaa aaaagaggat | 480 |
| attgccaaag gtctggttag cgcaattacc ggtgttgaag ttaaaaccat tgttccgagc | 540 |
| cctccgagca gcaccgttgg tagcagcggc accccgagca aaagcattta tctggttggt | 600 |
| gatagcctgc gtgttctgcc gcatgcaacc cattatcaga ccggtcagaa aattgcaaat | 660 |
| tgggttaaag gtcgcaccta caaaattctg caggttaaaa atgtgcatca gagcaatagc | 720 |

```
aaacgtgcat atctgctgga tggtattaaa agctgggttc tggaacagga tgttgaaggc    780
accaccaaag gtcatagcga acagacctat caggcacaga aaggtgatac ctattatggt    840
attgcccgta aatttggtct gagcgttgat accctgctgg ttgttaatgg tctgaaaaaa    900
agcgatattc tgaaagttgg tcagaccctg aaagttaatg ccgcaagccg taccaccacc    960
gcaattccga ccagcgttgc cagccgtgtt gttgcaagcg cactgagtaa agtgggtcag   1020
aaagttaccg ttccgagcaa tccgtatggt ggtcagtgtg ttgcactggt tgataaaatt   1080
gttcaagagc tgaccgacaa aaacatgagc tataccaatg caattgattg cctgaaaaaa   1140
gccaaaagca atggctttca ggtgatttat gatgcctggg gtgttaatcc gaaagccggt   1200
gatttttatg ttattcagac cgatggtatg gtgtatggtc atattggtgt tgtgttacc   1260 gatagtgatg gtaaaagcat tgatggtgtg aacagaaca ttgatggcta ttccgatcat   1320
aacaataacg gcattaatga tcagctggaa attggtggtg gtggcattac ccgtcgtgtt   1380
aaacgtcagt ggatggcaaa tggtagcctg tatgatagca ccggcaccgt taaactgggc   1440
aaagttgttg gttggtttcg tattagctaa                                   1470
```

<210> SEQ ID NO 9
<211> LENGTH: 489
<212> TYPE: PRT
<213> ORGANISM: Artificial Sequence
<220> FEATURE:
<223> OTHER INFORMATION: Synthetic construct

<400> SEQUENCE: 9

```
Met Gly Lys His Leu Val Ile Cys Gly His Gly Gln Gly Arg Thr Gly
1               5                   10                  15

Tyr Asp Pro Gly Ala Val Asn Ala Lys Leu Gly Ile Thr Glu Ala Gly
            20                  25                  30

Lys Val Arg Glu Leu Ser Lys Leu Met Ser Lys Tyr Ser Gly Gln Gln
        35                  40                  45

Ile Asp Phe Ile Thr Glu Gln Asn Val Tyr Asp Tyr Arg Ser Ile Thr
    50                  55                  60

Ser Ile Gly Lys Gly Tyr Asp Ser Ile Thr Glu Leu His Phe Asn Ala
65                  70                  75                  80

Phe Asn Gly Ser Ala Lys Gly Thr Glu Val Leu Ile Gln Ser Ser Leu
                85                  90                  95

Glu Ala Asp Lys Glu Asp Met Ala Ile Leu Ser Leu Leu Ser Arg Tyr
            100                 105                 110

Phe Gln Asn Arg Gly Ile Lys Lys Val Asp Trp Leu Tyr Asn Ala Asn
        115                 120                 125

Gln Ala Ala Ser Arg Gly Tyr Thr Tyr Arg Leu Val Glu Ile Ala Phe
    130                 135                 140

Ile Asp Asn Glu Gln Asp Met Ala Ile Phe Glu Asn Lys Lys Glu Asp
145                 150                 155                 160

Ile Ala Lys Gly Leu Val Ser Ala Ile Thr Gly Val Glu Val Lys Thr
                165                 170                 175

Ile Val Pro Ser Pro Ser Ser Thr Val Gly Ser Ser Gly Thr Pro
            180                 185                 190

Ser Lys Ser Ile Tyr Leu Val Gly Asp Ser Leu Arg Val Leu Pro His
        195                 200                 205

Ala Thr His Tyr Gln Thr Gly Gln Lys Ile Ala Asn Trp Val Lys Gly
    210                 215                 220
```

```
Arg Thr Tyr Lys Ile Leu Gln Val Lys Asn Val His Gln Ser Asn Ser
225                 230                 235                 240

Lys Arg Ala Tyr Leu Leu Asp Gly Ile Lys Ser Trp Val Leu Glu Gln
            245                 250                 255

Asp Val Glu Gly Thr Thr Lys Gly His Ser Glu Gln Thr Tyr Gln Ala
        260                 265                 270

Gln Lys Gly Asp Thr Tyr Tyr Gly Ile Ala Arg Lys Phe Gly Leu Ser
    275                 280                 285

Val Asp Thr Leu Leu Val Val Asn Gly Leu Lys Lys Ser Asp Ile Leu
290                 295                 300

Lys Val Gly Gln Thr Leu Lys Val Asn Ala Ala Ser Arg Thr Thr Thr
305                 310                 315                 320

Ala Ile Pro Thr Ser Val Ala Ser Arg Val Val Ala Ser Ala Leu Ser
                325                 330                 335

Lys Val Gly Gln Lys Val Thr Val Pro Ser Asn Pro Tyr Gly Gly Gln
            340                 345                 350

Cys Val Ala Leu Val Asp Lys Ile Val Gln Glu Leu Thr Asp Lys Asn
        355                 360                 365

Met Ser Tyr Thr Asn Ala Ile Asp Cys Leu Lys Lys Ala Lys Ser Asn
    370                 375                 380

Gly Phe Gln Val Ile Tyr Asp Ala Trp Gly Val Asn Pro Lys Ala Gly
385                 390                 395                 400

Asp Phe Tyr Val Ile Gln Thr Asp Gly Met Val Tyr Gly His Ile Gly
                405                 410                 415

Val Cys Val Thr Asp Ser Asp Gly Lys Ser Ile Asp Gly Val Glu Gln
            420                 425                 430

Asn Ile Asp Gly Tyr Ser Asp His Asn Asn Asn Gly Ile Asn Asp Gln
        435                 440                 445

Leu Glu Ile Gly Gly Gly Ile Thr Arg Arg Val Lys Arg Gln Trp
    450                 455                 460

Met Ala Asn Gly Ser Leu Tyr Asp Ser Thr Gly Thr Val Lys Leu Gly
465                 470                 475                 480

Lys Val Val Gly Trp Phe Arg Ile Ser
                485

<210> SEQ ID NO 10
<211> LENGTH: 582
<212> TYPE: DNA
<213> ORGANISM: Artificial Sequence
<220> FEATURE:
<223> OTHER INFORMATION: Synthetic construct

<400> SEQUENCE: 10
atgggcaaac atctggtgat tgtggtcat ggtcagggtc gtaccggtta tgatccgggt      60
gcagttaatg caaaactggg tattaccgaa gcaggtaaag ttcgtgaact gagcaaactg     120
atgagcaaat atagcggtca gcagatcgat tttatcaccg aacagaacgt gtatgattat     180
cgtagcatta ccagcattgg taaaggctat gacagcatta ccgaactgca ttttaatgcc     240
tttaatggta gcgcaaaagg caccgaagtt ctgattcaga gcagcctgga agcagataaa     300
gaagatatgg caattctgag cctgctgagc cgttattttc agaatcgtgg tatcaaaaaa     360
gtggattggc tgtataatgc aaatcaggca gcaagccgtg ttataccta tcgtctggtt     420 gaaattgcct tcatcgataa cgaacaggat atggccatct ttgaaaacaa aaagaggat     480
```

```
attgccaaag gtctggttag cgcaattacc ggtgttgaag ttaaaaccat tgttccgagc    540
cctccgagca gcaccgttgg tagcagcggc accccgagct aa                      582
```

<210> SEQ ID NO 11
<211> LENGTH: 193
<212> TYPE: PRT
<213> ORGANISM: Artificial Sequence
<220> FEATURE:
<223> OTHER INFORMATION: Synthetic construct

<400> SEQUENCE: 11

```
Met Gly Lys His Leu Val Ile Cys Gly His Gly Gln Gly Arg Thr Gly
1               5                   10                  15

Tyr Asp Pro Gly Ala Val Asn Ala Lys Leu Gly Ile Thr Glu Ala Gly
            20                  25                  30

Lys Val Arg Glu Leu Ser Lys Leu Met Ser Lys Tyr Ser Gly Gln Gln
        35                  40                  45

Ile Asp Phe Ile Thr Glu Gln Asn Val Tyr Asp Tyr Arg Ser Ile Thr
    50                  55                  60

Ser Ile Gly Lys Gly Tyr Asp Ser Ile Thr Glu Leu His Phe Asn Ala
65                  70                  75                  80

Phe Asn Gly Ser Ala Lys Gly Thr Glu Val Leu Ile Gln Ser Ser Leu
                85                  90                  95

Glu Ala Asp Lys Glu Asp Met Ala Ile Leu Ser Leu Leu Ser Arg Tyr
            100                 105                 110

Phe Gln Asn Arg Gly Ile Lys Lys Val Asp Trp Leu Tyr Asn Ala Asn
        115                 120                 125

Gln Ala Ala Ser Arg Gly Tyr Thr Tyr Arg Leu Val Glu Ile Ala Phe
    130                 135                 140

Ile Asp Asn Glu Gln Asp Met Ala Ile Phe Glu Asn Lys Lys Glu Asp
145                 150                 155                 160

Ile Ala Lys Gly Leu Val Ser Ala Ile Thr Gly Val Glu Val Lys Thr
                165                 170                 175

Ile Val Pro Ser Pro Pro Ser Ser Thr Val Gly Ser Ser Gly Thr Pro
            180                 185                 190

Ser
```

METHOD OF TREATING INFECTIONS BY BACTERIOLYTIC ENZYMES AND MANUFACTURE THEREOF

CROSS-REFERENCE TO RELATED APPLICATIONS

This is a United States national phase under 35 USC §371 of International Patent Application PCT/US 2020/058437 filed Oct. 31, 2020, which claims benefit under 35 USC § 119 of U.S. Provisional Patent Application 62/928,764 filed Oct. 31, 2019 in the names of Daniel C. Nelson, Sarah Beth Linden, and Niels Vander Elst for "METHOD OF TREATING INFECTIONS BY BACTERIOLYTIC ENZYMES AND MANUFACTURE THEREOF". The disclosures of all such applications are hereby incorporated herein by reference, in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "263_SeqListing_ST25.txt" created on Apr. 29, 2022 and is 21,426 bytes in size. The sequence listing contained in this .txt file is part of the specification and is hereby incorporated by reference herein in its entirety.

FIELD

The present disclosure relates to bacteriolytic enzymes useful for treating infections, and to methods of manufacturing such bacteriolytic enzymes, and methods of using such bacteriolytic enzymes for infection treatment.

DESCRIPTION OF THE RELATED ART

Acne vulgaris, commonly referred to as acne, is one of the most common skin diseases, affecting more than 45 million individuals in the United States alone, including infants and approximately 90% of adolescent boys and 80% of adolescent girls. The prevalence of acne in adults is increasing, especially in women over 25 years of age, and some individuals experience chronic acne throughout their lives. Acne is characterized by the formation of open and closed lesions, inflammatory pustules, papules, and nodules, ultimately leading to pigmentation of the skin or scarring. During adolescence, an increase in oil production by the sebaceous glands leads to hyperproliferation of keratinocytes, alterations in the skin microbiome, and differential growth and colonization by *Propionibacterium acnes* (*P. acnes*), with pro-inflammatory dermal responses to *P. acnes* infection leading to acne lesions.

It is estimated that over 20% of dermatologist visits are for the treatment of acne. While not a life-threatening condition, patients with acne undergo considerable psychological distress, exhibiting anxiety, lowered self-esteem, depression, social withdrawal, and suicidal ideation in extreme cases, and thereby entailing severe socioeconomic consequences. These factors motivate sufferers to seek and use a myriad of over-the-counter and prescription remedies. Topical treatments include face washes, creams, and ointments containing drying agents (typically retinoids or benzoyl peroxide), which help unclog pores, and/or antibiotics, all of which carry undesirable side effects. Retinoids can cause irritant dermatitis, which manifests as erythema, a burning sensation, or scaling/peeling of the skin, and excessive benzoyl peroxide can cause dryness of skin and irritant dermatitis. Long-term use of antibiotics is associated with photosensitivity and development of drug resistance.

Acne thus presents a significant economic and public health issue, and despite topical treatments representing a multibillion dollar per year market in the U.S. alone, therapeutic interventions for combating this disease have seen no major advancements in over 50 years.

*P. acnes*, recently renamed Cutibacterium *acnes*, in addition to being a causal agent of acne, is also associated with post-surgical site infections mainly affecting the upper body, as for example after shoulder or elbow surgery.

Among infectious bacterial agents, *Staphylococcus aureus* is another bacterium that is of considerable concern, since it can cause serious infections that lead to sepsis and even death, and strains of *S. aureus* may exhibit multi-drug resistance, including methicillin-resistant *S. aureus*, commonly known as MRSA.

New therapeutic agents and methods that are cidally effective against infectious bacteria including *P. acnes* (Cutibacterium *acnes*) and *Staphylococcus aureus* would therefore constitute a major advance in the art.

SUMMARY

The present disclosure generally relates to enzymes useful for treatment of infectious bacteria, and to related methods of manufacturing and use.

In one aspect, the disclosure relates to a method of treating or preventing *P. acnes* and/or *S. aureus* infection, comprising contacting *P. acnes* and/or *S. aureus*, or a physiological locus infected or susceptible to infection by *P. acnes* and/or *S. aureus*, with at least one bacteriolytic agent selected from the group consisting of: (i) a PlyT100 endolysin; (ii) an amidase enzymatically active domain of PlyT100 endolysin; (iii) a variant of PlyT100 endolysin that is bacteriolytically effective against *P. acnes* and/or *S. aureus*, and is at least 90% homologous to PlyT100 endolysin; (iv) a variant of the amidase enzymatically active domain of PlyT100 endolysin that is bacteriolytically effective against *P. acnes* and/or *S. aureus*, and is at least 90% homologous to the amidase enzymatically active domain of PlyT100 endolysin; (v) a PlySs9 endolysin; (vi) an amidase enzymatically active domain of PlySs9 endolysin; (vii) a variant of PlySs9 endolysin that is bacteriolytically effective against *P. acnes* and/or *S. aureus*, and is at least 90% homologous to PlySs9 endolysin; and (viii) a variant of the amidase enzymatically active domain of PlySs9 endolysin that is bacteriolytically effective against *P. acnes* and/or *S. aureus*, and is at least 90% homologous to the amidase enzymatically active domain of PlySs9 endolysin.

In another aspect, the disclosure relates to a pharmaceutical composition useful for treating or preventing *P. acnes* and/or *S. aureus* infection, comprising a pharmaceutically acceptable carrier and at least one bacteriolytic agent selected from the group consisting of: (i) a PlyT100 endolysin; (ii) an amidase enzymatically active domain of PlyT100 endolysin; (iii) a variant of PlyT100 endolysin that is bacteriolytically effective against *P. acnes* and/or *S. aureus*, and is at least 90% homologous to PlyT100 endolysin; (iv) a variant of the amidase enzymatically active domain of PlyT100 endolysin that is bacteriolytically effective against *P. acnes* and/or *S. aureus*, and is at least 90% homologous to the amidase enzymatically active domain of PlyT100 endolysin; (v) a PlySs9 endolysin; (vi) an amidase enzymatically active domain of PlySs9 endolysin; (vii) a variant of PlySs9 endolysin that is bacteriolytically effective against *P. acnes* and/or *S. aureus*, and is at least 90% homologous to PlySs9 endolysin; and (viii) a variant of the amidase enzymatically active domain of PlySs9 endolysin that is bacteriolytically effective against *P. acnes* and/or *S. aureus*, and is at least 90% homologous to the amidase enzymatically active domain of PlySs9 endolysin.

Other aspects, features and embodiments of the disclosure will be more fully apparent from the ensuing description and appended claims.

DETAILED DESCRIPTION

Figure 1:
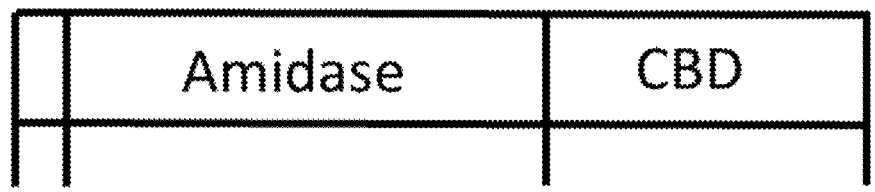
FIG. 1 is a schematic representation of PlyT100 endolysin genome cloned from a prophage within the ATCC T-100 *P. acnes* genome, containing 855 nucleotides and encoding a 28.5 kDa protein containing an amidase catalytic domain (CAT) and cell wall binding domain (CBD).

The present disclosure relates generally to enzymes, their preparation, and their therapeutic methods of use in treating infection.

The disclosure relates, in one aspect, to a method of treating or preventing *P. acnes* and/or *S. aureus* infection, comprising contacting *P. acnes* and/or *S. aureus*, or a physiological locus infected or susceptible to infection by *P. acnes* and/or *S. aureus*, with at least one bacteriolytic agent selected from the group consisting of: (i) a PlyT100 endolysin; (ii) an amidase enzymatically active domain of PlyT100 endolysin; (iii) a variant of PlyT100 endolysin that is bacteriolytically effective against *P. acnes* and/or *S. aureus*, and is at least 90% homologous to PlyT100 endolysin; (iv) a variant of the amidase enzymatically active domain of PlyT100 endolysin that is bacteriolytically effective against *P. acnes* and/or *S. aureus*, and is at least 90% homologous to the amidase enzymatically active domain of PlyT100 endolysin; (v) a PlySs9 endolysin; (vi) an amidase enzymatically active domain of PlySs9 endolysin; (vii) a variant of PlySs9 endolysin that is bacteriolytically effective against *P. acnes* and/or *S. aureus*, and is at least 90% homologous to PlySs9 endolysin; and (viii) a variant of the amidase enzymatically active domain of PlySs9 endolysin that is bacteriolytically effective against *P. acnes* and/or *S. aureus*, and is at least 90% homologous to the amidase enzymatically active domain of PlySs9 endolysin.

The method may be carried out with any one or more of the bacteriolytic agents (i) to (viii), in specific implementations of the disclosure.

In various embodiments, the method may be conducted with the bacteriolytic agent comprising an endolysin comprising SEQ ID NO: 3. In other embodiments, the method may be conducted with the bacteriolytic agent comprising an endolysin comprising SEQ ID NO: 4.

The method may be conducted for treatment or prevention of *P. acnes* infection of at least one *P. acnes* strain selected from the group consisting of Gareth, HL001 (488), HL025 (500), SK137 (122), and HL002 (491) *P. acnes* strains, and/or for the treatment or prevention of *S. aureus* infection of at least one *S. aureus* strain selected from the group consisting of NRS 14 and NRS 385 *S. aureus* strains. In other implementations, the method may be conducted for treatment or prevention of *S. aureus* infection of methicillin-resistant *S. aureus*.

In instances in which the method is carried out for treatment or prevention of *P. acnes* infection, the physiological locus may comprise a skin locus, with the contacting being comprised in topically administering to the skin locus a pharmaceutically acceptable composition comprising the bacteriolytic agent. For example, the contacting in the method may be comprised in applying the bacteriolytic agent to facial skin as the physiological locus.

In other instances, in which the method is carried out for treatment or prevention of *S. aureus* infection, the physiological locus may comprise a post-surgical site. For such purpose, the bacteriolytic agent may be administered for the contacting in a dermal or transdermal patch or bandage from which the bacteriolytic agent is administered to the post-surgical site for dermal and/or subdermal treatment or prophylaxis.

The method as variously described above may be performed pursuant to instruction of a physician or a medical or public health authority.

The disclosure relates in another aspect to a pharmaceutical composition useful for treating or preventing *P. acnes* and/or *S. aureus* infection, comprising a pharmaceutically acceptable carrier and at least one bacteriolytic agent selected from the group consisting of: (i) a PlyT100 endolysin; (ii) an amidase enzymatically active domain of PlyT100 endolysin; (iii) a variant of PlyT100 endolysin that is bacteriolytically effective against *P. acnes* and/or *S. aureus*, and is at least 90% homologous to PlyT100 endolysin; (iv) a variant of the amidase enzymatically active domain of PlyT100 endolysin that is bacteriolytically effective against *P. acnes* and/or *S. aureus*, and is at least 90% homologous to the amidase enzymatically active domain of PlyT100 endolysin; (v) a PlySs9 endolysin; (vi) an amidase enzymatically active domain of PlySs9 endolysin; (vii) a variant of PlySs9 endolysin that is bacteriolytically effective against *P. acnes* and/or *S. aureus*, and is at least 90% homologous to PlySs9 endolysin; and (viii) a variant of the amidase enzymatically active domain of PlySs9 endolysin that is bacteriolytically effective against *P. acnes* and/or *S. aureus*, and is at least 90% homologous to the amidase enzymatically active domain of PlySs9 endolysin.

The composition may comprise any one or more of such bacteriolytic agents (i) to (viii). The composition may for example be constituted with the bacteriolytic agent comprising an endolysin of SEQ ID NO: 3, or in endolysin of SEQ ID NO: 4. The pharmaceutical composition may comprise a solution, suspension, lotion, emulsion, cream, gel, salve, or ointment. In various embodiments, the pharmaceutical composition may be contained in a dermal or transdermal patch or bandage. In still other embodiments, the composition may further comprise one or more retinoids, or benzoyl peroxide, enabling the amounts of such co-active ingredients to be minimized to correspondingly minimize or substantially eliminate any side effects or undesirable characteristics of such co-active ingredients.

The present disclosure is based on the discovery of endolysins that demonstrate bacteriolytic activity against *P. acnes* as well as bacteriolytic activity against *S. aureus*, including methicillin-resistant *S. aureus*.

Bacteriophage—viruses that attack bacteria—produce enzymes called endolysins that cleave the bacterial cell wall leading to lysis and release of newly formed bacteriophage. Notably, purified endolysins applied directly to susceptible bacteria result in lysis upon contact, providing a non-antibiotic alternative to kill bacteria. Significantly, endolysins are not susceptible to common mechanisms of antibiotic resistance (e.g., efflux pumps, penicillin binding proteins, and alterations of metabolic pathways), and thus are effective even against multi-drug resistant bacteria.

Endolysins are composed of an enzymatically active domain (EAD) linked to a cell wall binding domain (CBD). The EAD is responsible for the cell wall cleaving activity, and is similar across different bacteriophage. In contrast, the CBD is variable; CBDs from different bacteriophage bind to particular cell wall patterns specific to the bacterial host. This confers bacterial species or even strain specificity to the endolysin, implying that unlike broad-spectrum antibiotics, endolysins do not negatively affect normal/beneficial microflora on the skin surface.

Endolysins of the present disclosure embody a fundamental advance in the art for combating bacterial infections of *P. acnes, S. aureus*, and the like. Insofar as the present inventors are aware, endolysins have never been developed against *P. acnes* or associated bacteria.

In the effort to discover endolysins effective against *P. acnes* for topical application, the present inventors expressed, purified, and characterized every punitive endolysin of all known *P. acnes* bacteriophage, and discovered that the endolysin PlyT100, and the endolysin PlySu9 (sometimes hereinafter referred to as PlySs9), exhibited surprisingly and unexpectedly potent antimicrobial activity toward *P. acnes* as well as against *S. aureus*, including MRSA.

This serendipitous discovery is notable for two reasons. First, it is rare that an endolysin works on multiple bacterial species since its CBD usually governs specificity. Second, while *P. acnes* is the predominant bacterial pathogen associated with acne vulgaris, *S. aureus* has also been found to correlate with acne lesions and numerous other skin conditions, including eczema and rosacea. Finally, because PlyT100 and PlySu9 do not appear to be constrained by their CBD domain, the present inventors tested just the EAD domains from each enzyme. Remarkably, the EAD-only constructs from each enzyme retained potent killing ability against both *P. acnes* and *S. aureus*.

Accordingly, the present disclosure relates in various aspects to topical use of full-length and truncated EADs of endolysins PlyT100 and PlySu9 against *P. acnes* bacteria and related skin pathogens (including *S. aureus*).

The enzymes of the present disclosure useful for antibacterial application thus include the full length endolysins PlyT100 and PlySu9, as well as enzymatically active domain fragments and derivatives thereof, that exhibit endolytic activity against *P. acnes* and *S. aureus* bacteria.

Due to their endolytic mechanism of action, the use of enzymes of the present disclosure does not promote antibiotic resistance, and such enzymes exhibit cidal activity against even multi-drug-resistant bacteria. Further, since such enzymes derivatively correlate to bacteriophages that only infect certain bacteria, the use of such enzymes as skin care agents for combating acne and as agents for combating *S. aureus* infections does not affect beneficial microflora on the skin and in other corporeal environments. Accordingly, the use of the enzymes of the present disclosure provides a targeted solution for treatment of acne and *S. aureus* infections without the side effects of chemical remedies or the development of antibiotic resistance.

The present disclosure relates in various aspects to methods of combating acne, including acne vulgaris, by administration to a dermal locus affected by or susceptible to acne, of an enzyme of the present disclosure.

The present disclosure in other aspects relates to methods of combating *S. aureus* infection, by administration to a corporeal locus affected by or susceptible to such infection, of an enzyme of the present disclosure. As an illustrative example, an enzyme of the present disclosure may be utilized in a post-surgical wound dressing that is applied to a wound area affected by or susceptible to infection against which the enzyme is bacteriolytically effective.

In various embodiments, the enzymes are full length PlyT100 or PlySs9 endolysins, or truncated enzymatically active domains (EADs) of such endolysins, or variants of such endolysins or EADs that are bacteriolytically effective and have high sequence similarity thereto, e.g., at least 90%, 92%, 95%, 97%, 98%, 99%, or 99.5% homology thereto. In illustrative embodiments described herein, PlyT100, the isolated catalytic domain (EAD) of PlyT100, PlySu9, or the isolated catalytic domain (EAD) of PlySu9, may be used individually or in any suitable combinations as the enzyme in treating or otherwise combating bacterial infections in accordance with the present disclosure.

The PlyT100 endolysin gene sequence (SEQ ID NO: 1) and optimized gene sequence (SEQ ID NO: 2) are set out below, together with the enzyme expression product (SEQ ID NO: 3) of the PlyT100 endolysin gene sequence of SEQ ID NO: 1, and the enzyme expression product (SEQ ID NO: 4) of the optimized gene sequence of SEQ ID NO: 2. Also set out below are the sequence of the amidase catalytic domain sequence of the optimized PlyT100 (SEQ ID NO: 5), the enzyme expression product of SEQ ID NO: 5 (amidase catalytic domain of PlyT100) (SEQ ID NO: 6), the PlySs9 endolysin gene sequence (SEQ ID NO: 7), the optimized PlySs9 gene sequence (SEQ ID NO: 8), the enzyme expression product of SEQ ID NOs: 7 and 8 (PlySs9) (SEQ ID NO: 9), the amidase catalytic domain sequence of optimized PlySs9 (SEQ ID NO: 10), and the expression product of SEQ ID NO: 10 (amidase catalytic domain of PlySs9) (SEQ ID NO: 11).

(PlyT100 endolysin gene sequence)

SEQ ID NO: 1

GTGAGATACATTCCAGCAGCGCACCATTCGGCCGGCTCTAATCATCCGGT

GAATAGGGTTGTGATTCATGCGACATGCCCGGATGTGGGGTTTCCGTCCGCCTCCCG

-continued

```
TAAAGGGCGTGCTGTTTCTACAGCAAACTATTTTGCTTCCCCATCATCGGGGGGTTCG

GCTCATTATGTGTGTGATATTGGGGAGACGGTGCAGTGCCTGTCCGAGGGCACTATT

GGCTGGCATGCCCCGCCTAATCCGCACAGCCTGGGTATAGAGATTTGCGCCGATGGG

GGTTCGCACGCCTCGTTCCGGGTGCCAGGGCATGCTTACACGAGGGAGCAGTGGCTG

GATCCTCGCGTGTGGCCTGCGGTGGAGAAGGCTGCCATCCTGTGTAGACGTTTGTGT

GACAAATATAATGTTCCAAAGAGGAAGCTTAGTGCAGCCGATTTGAAGGCTGGCAG

GCGGGGTGTGTGCGGGCATGTGGATGTTACGGATGCGTGGCATCAGTCGGATCATGA

CGATCCGGGGCCGTGGTTTCCGTGGGACAGGTTTATGGCCGTTGTCAACGGTCACAA

TGAGAGTGGGGAGTTAACTGTGGCTGATGTGAAAGCCTTGCATGATCAGATTAAACA

ATTGTCTGCGCAGCTTGCCGGTTCGGTGAATAAGCTGCACCACGATGTTGGTGTAGT

GCAGGTGCAGAATGGTGACCTGGGTAAGCGTGTGGATGCCCTGTCGTGGGTGAAGA

ATCCGGTGACCGGGAAGCTGTGGCGCACCAAGGACGCCCTGTGGAGTGTCTGGTATT

ACGTGCTGGAGTGTCGTAGCCGTATTGACAGGCTTGAGTCTGCTGTTAACGGTTTAA

AAAAGTGA
```

(optimized PlyT100 gene sequence)
SEQ ID NO: 2
```
ATGCGTTATATTCCGGCAGCACATCATTCAGCAGGTAGCAATCATCCGGTTAATCGT

GTTGTTATTCATGCAACCTGTCCGGATGTTGGTTTTCCGAGCGCAAGCCGTAAAGGTC

GTGCAGTTAGCACCGCAAACTATTTTGCAAGCCCGAGCAGCGGTGGTAGCGCACATT

ATGTTTGTGATATTGGTGAAACCGTTCAGTGTCTGAGCGAAGGCACCATTGGTTGGC

ATGCACCGCCTAATCCGCATAGCCTGGGTATTGAAATTTGTGCAGATGGTGGTAGCC

ATGCAAGCTTTCGTGTTCCGGGTCATGCATATACCCGTGAACAGTGGCTGGATCCGC

GTGTTTGGCCTGCAGTTGAAAAAGCAGCAATTCTGTGTCGTCGTCTGTGCGATAAAT

ACAATGTTCCGAAACGTAAACTGAGCGCAGCAGATCTGAAAGCAGGTCGTCGTGGT

GTTTGTGGTCATGTTGATGTTACCGATGCATGGCATCAGAGCGATCATGATGATCCG

GGTCCGTGGTTTCCGTGGGATCGTTTTATGGCAGTTGTTAATGGTCATAACGAAAGC

GGTGAACTGACCGTTGCAGATGTTAAAGCACTGCATGATCAGATTAAACAGCTGAGT

GCACAGCTGGCAGGTAGCGTTAATAAACTGCATCACGATGTTGGTGTTGTTCAGGTT

CAGAATGGTGATCTGGGTAAACGTGTTGATGCACTGAGCTGGGTTAAAAATCCGGTG

ACCGGTAAACTGTGGCGTACCAAAGATGCACTGTGGTCAGTTTGGTATTATGTTCTG

GAATGTCGTAGCCGTATTGATCGTCTGGAAAGCGCAGTGAATGGTCTGAAAAAATAA
```

(enzyme expression product of SEQ ID NO: 1 (PlyT100))
SEQ ID NO: 3
```
VRYIPAAHHSAGSNHPVNRVVIHATCPDVGFPSASRKGRAVSTANYFASPSSGGSAHYV

CDIGETVQCLSEGTIGWHAPPNPHSLGIEICADGGSHASFRVPGHAYTREQWLDPRVWPA

VEKAAILCRRLCDKYNVPKRKLSAADLKAGRRGVCGHVDVTDAWHQSDHDDPGPWFP

WDRFMAVVNGHNESGELTVADVKALHDQIKQLSAQLAGSVNKLHHDVGVVQVQNGD

LGKRVDALSWVKNPVTGKLWRTKDALWSVWYYVLECRSRIDRLESAVNGLKK
```

(enzyme expression product of SEQ ID NO: 2 (Optimized PlyT100 sequence))
SEQ ID NO: 4
```
MRYIPAAHHSAGSNHPVNRVVIHATCPDVGFPSASRKGRAVSTANYFASPSS

GGSAHYVCDIGETVQCLSEGTIGWHAPPNPHSLGIEICADGGSHASFRVPGHAYTREQWL

DPRVWPAVEKAAILCRRLCDKYNVPKRKLSAADLKAGRRGVCGHVDVTDAWHQSDHD
```

-continued

DPGPWFPWDRFMAVVNGHNESGELTVADVKALHDQIKQLSAQLAGSVNKLHHDVGVV

QVQNGDLGKRVDALSWVKNPVTGKLWRTKDALWSVWYYVLECRSRIDRLESAVNGL

KK (amidase catalytic domain sequence of optimized PlyT100)
SEQ ID NO: 5
ATGGCAGGTAGCAATCATCCGGTTAATCGTGTTGTTATTCATGCAACCTG

TCCGGATGTTGGTTTTCCGAGCGCAAGCCGTAAAGGTCGTGCAGTTAGCACCGCAAA

CTATTTTGCAAGCCCGAGCAGCGGTGGTAGCGCACATTATGTTTGTGATATTGGTGA

AACCGTTCAGTGTCTGAGCGAAGGCACCATTGGTTGGCATGCACCGCCTAATCCGCA

TAGCCTGGGTATTGAAATTTGTGCAGATGGTGGTAGCCATGCAAGCTTTCGTGTTCCG

GGTCATGCATATACCCGTGAACAGTGGCTGGATCCGCGTGTTTGGCCTGCAGTTGAA

AAAGCAGCAATTCTGTGTCGTCGTCTGTGCGATAAATACAATGTTCCGAAACGTAAA

CTGAGCGCAGCAGATCTGAAAGCAGGTCGTCGTGGTGTTTGTGGTCATGTTGATGTT

ACCGATGCATGGCATCAGAGCGATCATGATGATCCTGGTCCGTGGTTTCCGTGGGAT

CGTTTTATGGCAGTTGTTAATGGTTAA (enzyme expression product of SEQ ID NO: 5 (amidase
catalytic domain of PlyT100))
SEQ ID NO: 6
MAGSNHPVNRVVIHATCPDVGFPSASRKGRAVSTANYFASPSSGGSAHYVC

DIGETVQCLSEGTIGWHAPPNPHSLGIEICADGGSHASFRVPGHAYTREQWLDPRVWPAV

EKAAILCRRLCDKYNVPKRKLSAADLKAGRRGVCGHVDVTDAWHQSDHDDPGPWFPW

DRFMAVVNG (PlySs9 endolysin gene sequence)
SEQ ID NO: 7
ATGGGAAAACATCTAGTCATTTGTGGTCATGGGCAAGGGCGAACAGGCT

ATGATCCTGGAGCAGTGAATGCCAAACTAGGCATCACAGAAGCTGGAAAGGTTCGA

GAATTATCCAAGTTAATGTCCAAGTACAGTGGACAACAGATTGATTTTATTACCGAA

CAAAATGTTTATGATTATCGGAGTATTACTAGTATTGGTAAGGGATACGACTCAATT

ACTGAATTGCACTTCAATGCCTTTAATGGTAGTGCCAAAGGTACAGAAGTCTTGATT

CAATCTTCTTTAGAAGCAGACAAGGAGGATATGGCTATCCTATCTCTCCTTTCACGAT

ACTTTCAAAATCGTGGCATAAAGAAGGTAGATTGGCTCTATAATGCCAACCAAGCAG

CGAGTCGTGGATATACCTATCGTTTGGTGGAGATTGCCTTTATCGATAATGAACAAG

ATATGGCGATTTTTGAAAACAAGAAAGAGGACATTGCGAAAGGTCTTGTGTCAGCAA

TAACAGGAGTTGAAGTCAAGACAATAGTTCCCTCGCCCCCCAGTTCAACTGTTGGGA

GTTCAGGTACTCCTTCAAAATCAATCTATCTTGTTGGTGATAGTCTTAGGGTGTTGCC

TCATGCGACTCATTATCAGACTGGTCAGAAAATTGCCAACTGGGTCAAAGGGCGCAC

CTACAAAATCCTCCAAGTGAAGAATGTTCACCAGTCCAACAGTAAGAGAGCTTATCT

ACTTGATGGAATCAAGTCATGGGTGCTAGAGCAGGATGTAGAAGGAACAACCAAAG

GCCATAGTGAGCAGACCTATCAAGCACAGAAAGGCGATACGTATTATGGAATCGCTC

GGAAGTTTGGTCTATCAGTAGATACCCTTCTTGTAGTGAATGGTTTGAAGAAGTCGG

ATATACTGAAAGTTGGACAAACACTCAAGGTTAACGCTGCTTCAAGGACAACAACTG

CTATTCCAACTAGCGTTGCAAGCCGTGTGGTTGCGTCAGCTTTATCTAAGGTCGGTCA

AAAGGTGACCGTTCCATCTAATCCTTATGGTGGGCAGTGTGTTGCCTTGGTGGATAA

GATTGTTCAAGAACTTACGGACAAGAATATGTCCTATACTAATGCCATTGATTGTTTG

```
AAGAAAGCAAAATCAAATGGTTTCCAAGTAATCTACGATGCTTGGGGTGTAAATCCT

AAAGCAGGTGATTTTTATGTCATTCAAACAGATGGTATGGTTTACGGGCATATTGGT

GTCTGTGTGACGGATTCTGATGGAAAAAGTATTGATGGTGTGGAACAGAATATTGAT

GGATATTCTGACCATAATAATAACGGTATCAATGACCAATTAGAAATTGGTGGCGGT

GGAATTACTCGTCGTGTGAAACGGCAATGGATGGCGAATGGCTCACTCTATGATTCT

ACTGGAACAGTTAAACTTGGAAAAGTTGTTGGTTGGTTTAGAATTTCATAA
```

(optimized PlySs9 gene sequence)

SEQ ID NO: 8

```
ATGGGCAAACATCTGGTGATTTGTGGTCATGGTCAGGGTCGTACCGGTTA

TGATCCGGGTGCAGTTAATGCAAAACTGGGTATTACCGAAGCAGGTAAAGTTCGTGA

ACTGAGCAAACTGATGAGCAAATATAGCGGTCAGCAGATCGATTTTATCACCGAACA

GAACGTGTATGATTATCGTAGCATTACCAGCATTGGTAAAGGCTATGACAGCATTAC

CGAACTGCATTTTAATGCCTTTAATGGTAGCGCAAAAGGCACCGAAGTTCTGATTCA

GAGCAGCCTGGAAGCAGATAAAGAAGATATGGCAATTCTGAGCCTGCTGAGCCGTT

ATTTTCAGAATCGTGGTATCAAAAAAGTGGATTGGCTGTATAATGCAAATCAGGCAG

CAAGCCGTGGTTATACCTATCGTCTGGTTGAAATTGCCTTCATCGATAACGAACAGG

ATATGGCCATCTTTGAAAACAAAAAAGAGGATATTGCCAAAGGTCTGGTTAGCGCAA

TTACCGGTGTTGAAGTTAAAACCATTGTTCCGAGCCCTCCGAGCAGCACCGTTGGTA

GCAGCGGCACCCCGAGCAAAAGCATTTATCTGGTTGGTGATAGCCTGCGTGTTCTGC

CGCATGCAACCCATTATCAGACCGGTCAGAAAATTGCAAATTGGGTTAAAGGTCGCA

CCTACAAAATTCTGCAGGTTAAAAATGTGCATCAGAGCAATAGCAAACGTGCATATC

TGCTGGATGGTATTAAAAGCTGGGTTCTGGAACAGGATGTTGAAGGCACCACCAAAG

GTCATAGCGAACAGACCTATCAGGCACAGAAAGGTGATACCTATTATGGTATTGCCC

GTAAATTTGGTCTGAGCGTTGATACCCTGCTGGTTGTTAATGGTCTGAAAAAAAGCG

ATATTCTGAAAGTTGGTCAGACCCTGAAAGTTAATGCCGCAAGCCGTACCACCACCG

CAATTCCGACCAGCGTTGCCAGCCGTGTTGTTGCAAGCGCACTGAGTAAAGTGGGTC

AGAAAGTTACCGTTCCGAGCAATCCGTATGGTGGTCAGTGTGTTGCACTGGTTGATA

AAATTGTTCAAGAGCTGACCGACAAAAACATGAGCTATACCAATGCAATTGATTGCC

TGAAAAAAGCCAAAAGCAATGGCTTTCAGGTGATTTATGATGCCTGGGGTGTTAATC

CGAAAGCCGGTGATTTTTATGTTATTCAGACCGATGGTATGGTGTATGGTCATATTGG

TGTTTGTGTTACCGATAGTGATGGTAAAAGCATTGATGGTGTGGAACAGAACATTGA

TGGCTATTCCGATCATAACAATAACGGCATTAATGATCAGCTGGAAATTGGTGGTGG

TGGCATTACCCGTCGTGTTAAACGTCAGTGGATGGCAAATGGTAGCCTGTATGATAG

CACCGGCACCGTTAAACTGGGCAAAGTTGTTGGTTGGTTTCGTATTAGCTAA
```

(enzyme expression product of SEQ ID NOs: 7 and 8 (PlySs9))

SEQ ID: 9

MGKHLVICGHGQGRTGYDPGAVNAKLGITEAGKVRELSKLMSKYSGQQIDF

ITEQNVYDYRSITSIGKGYDSITELHFNAFNGSAKGTEVLIQSSLEADKEDMAILSLLSRYF

QNRGIKKVDWLYNANQAASRGYTYRLVEIAFIDNEQDMAIFENKKEDIAKGLVSAITGV

EVKTIVPSPPSSTVGSSGTPSKSIYLVGDSLRVLPHATHYQTGQKIANWVKGRTYKILQVK

NVHQSNSKRAYLLDGIKSWVLEQDVEGTTKGHSEQTYQAQKGDTYYGIARKFGLSVDT

LLVVNGLKKSDILKVGQTLKVNAASRTTTAIPTSVASRVVASALSKVGQKVTVPSNPYG

GQCVALVDKIVQELTDKNMSYTNAIDCLKKAKSNGFQVIYDAWGVNPKAGDFYVIQTD

-continued

GMVYGHIGVCVTDSDGKSIDGVEQNIDGYSDHNNNGINDQLEIGGGGITRRVKRQWMA

NGSLYDSTGTVKLGKVVGWFRIS (amidase catalytic domain sequence of optimized PlySs9)
SEQ ID: 10
ATGGGCAAACATCTGGTGATTTGTGGTCATGGTCAGGGTCGTACCGGTTA

TGATCCGGGTGCAGTTAATGCAAAACTGGGTATTACCGAAGCAGGTAAAGTTCGTGA

ACTGAGCAAACTGATGAGCAAATATAGCGGTCAGCAGATCGATTTTATCACCGAACA

GAACGTGTATGATTATCGTAGCATTACCAGCATTGGTAAAGGCTATGACAGCATTAC

CGAACTGCATTTTAATGCCTTTAATGGTAGCGCAAAAGGCACCGAAGTTCTGATTCA

GAGCAGCCTGGAAGCAGATAAAGAAGATATGGCAATTCTGAGCCTGCTGAGCCGTT

ATTTTCAGAATCGTGGTATCAAAAAAGTGGATTGGCTGTATAATGCAAATCAGGCAG

CAAGCCGTGGTTATACCTATCGTCTGGTTGAAATTGCCTTCATCGATAACGAACAGG

ATATGGCCATCTTTGAAAACAAAAAAGAGGATATTGCCAAAGGTCTGGTTAGCGCAA

TTACCGGTGTTGAAGTTAAAACCATTGTTCCGAGCCCTCCGAGCAGCACCGTTGGTA

GCAGCGGCACCCCGAGCTAA (expression product of SEQ ID NO: 10 (amidase catalytic
domain of PlySs9))
SEQ ID: 11
MGKHLVICGHGQGRTGYDPGAVNAKLGITEAGKVRELSKLMSKYSGQQIDF

ITEQNVYDYRSITSIGKGYDSITELHFNAFNGSAKGTEVLIQSSLEADKEDMAILSLLSRYF

QNRGIKKVDWLYNANQAASRGYTYRLVEIAFIDNEQDMAIFENKKEDIAKGLVSAITGV

EVKTIVPSPPSSTVGSSGTPS

The enzymes of the present disclosure are further illustratively described and exemplified herein in specific application to the treatment of acne vulgaris and infections involving S. aureus, but it will be recognized that the scope of the present disclosure is not limited thereto, and that enzymes of the present disclosure may be utilized for treatment or prophylaxis against any bacteria against which such enzymes are bacteriolytically effective.

In various embodiments of the present disclosure, a method of therapeutic intervention is carried out in which the enzyme is applied to a bacterium, or to a locus in which the bacterium is or may become present, in order to treat or prevent infection.

In specific applications, a method may be conducted treating or preventing P. acnes and/or S. aureus infection in a subject, e.g., an animal subject, more preferably a mammalian subject, and most preferably a human subject, comprising administering to the subject a therapeutically effective amount of at least one bacteriolytic agent selected from the group consisting of: (i) a PlyT100 endolysin; (ii) an amidase enzymatically active domain of PlyT100 endolysin; (iii) a variant of PlyT100 endolysin that is bacteriolytically effective against P. acnes and/or S. aureus, and is at least 90% homologous to PlyT100 endolysin; (iv) a variant of the amidase enzymatically active domain of PlyT100 endolysin that is bacteriolytically effective against P. acnes and/or S. aureus, and is at least 90% homologous to the amidase enzymatically active domain of PlyT100 endolysin; (v) a PlySs9 endolysin; (vi) an amidase enzymatically active domain of PlySs9 endolysin; (vii) a variant of PlySs9 endolysin that is bacteriolytically effective against P. acnes and/or S. aureus, and is at least 90% homologous to PlySs9 endolysin; and (viii) a variant of the amidase enzymatically active domain of PlySs9 endolysin that is bacteriolytically effective against P. acnes and/or S. aureus, and is at least 90% homologous to the amidase enzymatically active domain of PlySs9 endolysin.

The enzymes of the present disclosure may be administered in any suitable amounts and compositions to any suitable physiological loci to which such enzymes provide therapeutic benefit.

For example, enzymes of the present disclosure may be formulated in pharmaceutically acceptable compositions adapted for the specific mode of administration, including suitable carriers, vehicles, solvents, and excipients. Such compositions may for example include any of solutions, suspensions, lotions, emulsions, creams, gels, salves, ointments, or other compositions appropriate to the mode of administration. For topical administration, the enzymes may be formulated in a cosmetically acceptable formulation, i.e., a formulation that when applied to the skin, scalp, or other exterior physiological locus, typically does not produce any undesired cosmetic, allergic, or other adverse physiological reaction when administered to a human. As a specific example, the enzymes may be formulated in an ointment formulation having a suitable base material such as AQUAPHOR® petroleum jelly ointment, CETOMACROGOL™ polyethylene glycol hexadecyl ether cream, optionally with excipient ingredients such as for example moisturizer, humectant, and/or emollient ingredients.

In various specific embodiments, wherein the physiological locus infected or susceptible to infection with S. aureus comprises a human skin locus that is infected or susceptible to infection with S. aureus, such as a post-surgical site, the enzyme(s) may be formulated in a dermal or transdermal patch or bandage from which the enzyme(s) is/are administered to the skin area for dermal and/or subdermal treatment or prophylaxis.

As used herein, the term "pharmaceutically acceptable" in reference to compositions containing enzyme(s) of the present disclosure means compositions that are physiologically tolerable and do not typically produce any undesired allergic or other adverse physiological reaction when administered to a human. Preferably, "pharmaceutically acceptable" means approved or approvable by a regulatory agency of the Federal or state government or listed in the U.S. Pharmacopeia or other generally recognized pharmacopeia for use in animals, and more particularly in humans.

Compositions and formulations of the present disclosure, incorporating the enzyme(s) of the disclosure, may additionally incorporate other active ingredients, synergists, pharmacokinetic modulants, or the like, as therapeutically compatible and beneficial in specific compositions and formulations.

As used herein, the term "treatment" includes (a) inhibiting the development of a disease, disorder, or symptoms; (b) alleviating a disease, disorder or symptoms; or (c) eliminating the disease, disorder, or symptoms.

Although contemplated principally for topical use of the enzymes of the present disclosure, in topically administered or administrable compositions or formulations, the present disclosure is not limited thereto, and the enzymes of the present disclosure may in other applications be constituted in other compositions, formulations, and dose forms for non-topical use and administration, e.g., for parenteral as well as non-parenteral use and administration, such as intravenous, subcutaneous, intramuscular, oral, intraperitoneal, intraspinal, intrasynovial, nasal, or other administration, in powders, pills, tablets, granules, capsules, syrups, lyophilized preparations, suppositories, etc. Dosages and dosage schedules may be varied depending on the manner and mode of administration, and appropriately selected by those of ordinary skill in the art, based on the disclosure herein.

In addition to use of the enzymes of the present disclosure for treatment of bacteria and bacterial infections, such enzymes may be used prophylactically, to avoid, minimize, or lessen the severity of the onset or development of bacterial infections and diseases for which such enzymes are prophylactically useful.

Thus, in the practice of the present disclosure, both *P. acnes* and *S. aureus* are specifically contemplated as bacteria to be treated or prophylactically addressed, though other bacteria may also respond similarly to treatment or prophylaxis. The method of applying PlyT100 and its isolated catalytic domain as a therapeutic has been demonstrated to be successful in treating not only *P. acnes*, from which it is derived, but also *S. aureus*, as another organism linked to acne vulgaris as well as more serious skin conditions. Similarly, the method of applying PlySu9 and its isolated catalytic domain as a therapeutic has been demonstrated to be successful in treating both *S. aureus* and *P. acnes*. The endolysins described herein have been expressed and purified in order to enable the successful treatment of bacterial infection, and such endolysins and their EADs have demonstrated positive results in treating both *P. acnes* and *S. aureus*. The results obtained with such enzymes suggest that enzymes as described herein may be useful in treating infections arising from a variety of other bacteria.

The features and advantages of the bacteriolytic enzymes and methods of the present disclosure are more fully shown with reference to the following illustrative example, which is not intended to be construed or considered as limiting the present disclosure or the implementations or applications thereof.

Example 1

Preparation of Endolysins

Endolysins derived from *P. acnes* (PlyT100) and *S. suis* (PlySs9) bacteriophages were cloned and demonstrated bacteriolytic activity against both *P. acne* and *S. aureus*. The endolysins were prepared according to the following procedure.

Cell pellets were frozen at −80° C. for 15-20 min before sonication. Frozen pellets were thawed in lysis buffer (phosphate buffered saline supplemented with 10 mM imidazole, 1 mM phenylmethylsulfonyl fluoride (PMSF), pH 7.4) with 185 rpm shaking on an orbital shaker until the pellet was completely dissolved. The resulting solution was sonicated (duty cycle 30, output control 6) for 14 minutes to lyse cells.

After sonication, cell debris was removed by centrifugation at 12,000 rpm for 45 min at 4° C. The supernatant containing soluble protein was filtered with a 0.45 mm filter and recombinant proteins were applied to MINI PROFINI-TYT™ IMAC Cartridges (Bio-Rad) and eluted in 10 mL fractions of 20, 50, 100, 250, and 500 mM imidazole. Proteins were analyzed by SDS-polyacrylamide gel electrophoresis (SDS-PAGE) for purity. Fractions containing homologous recombinant proteins were pooled and dialyzed overnight against PBS (pH 7.4) supplemented with 300 mM NaCl. Protein concentrations were determined by the Bradford assay following manufacturer's instructions. Purified proteins were stored at −80° C. in PBS (pH 7.4) supplemented with 15% glycerol.

For the full-length PlyT100, in addition to the His-tag, a maltose binding protein (MBP) tag was used in the generation of recombinant protein expression vector, for which an amylose column was used to purify the protein in soluble form followed by cleavage of the MBP tag. After MBP was cleaved, the recombinant protein was purified using the same above procedure employed for the His-tagged protein.

The PlyT100 endolysin was cloned from a prophage within the ATCC T-100 *P. acnes* genome. The gene contains 855 nucleotides and encodes a 28.5 kDa protein containing an amidase catalytic domain (CAT) and putative cell wall binding domains (CBD), as illustratively depicted in FIG. 1.

Figure 2:
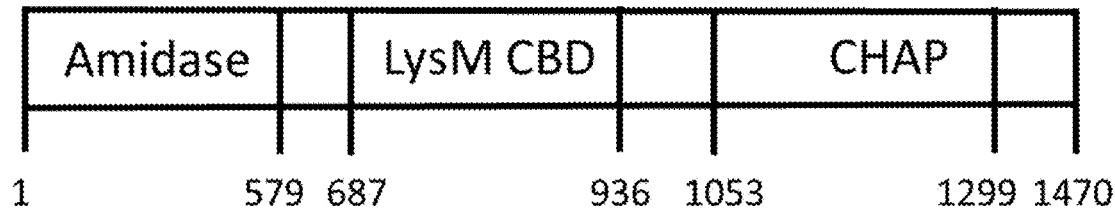
FIG. 2 is a schematic representation of PlySu9 (sometimes hereinafter referred to as PlySs9) endolysin genome cloned from a prophage within the D12 *Streptococcus suis* genome, containing 1470 nucleotides and encoding a protein containing an amidase catalytic domain (Amidase), LysM CBD motif (LysM) domain, and a cysteine, histidine-dependent amidohydrolase/peptidase (CHAP) domain.

Halo assays were performed on several *P. acnes* and *S. aureus* strains, on both the full length enzymes and on the amidase only domains. 10 ml cultures were washed 1× in PBS, resuspended in 0.5 ml PBS+10 ml 0.7% agarose to make a bacteria embedded agarose plate. Next, 10 μg of the full-length enzyme or 25 μg of the amidase domain (EAD only) were spotted on the plate and allowed to incubate over night at 37° C. Halos, or clearing zones were visualized directly on the plates by holding them up to the light. Alternatively, the entire plate was stained with 0.4% crystal violet and destained with water to enhance the contrast of the halo. Identical experiments were performed with PlySu9 (=PlySs9; see FIG. 2) or the PlySu9 (=PlySs9) amidase catalytic domain. These bacteriolytic assays were quantified according to the size of the clearing zone, with "++" indicating a clearing zone >2 cm, "+" indicates clearing zone <2 cm, and "−" indicates absence of a clearing zone.

The strains used in the tests were: (i) for *P. acnes*, Gareth, HL001 (488), HL025 (500), SK137 (122), and HL002 (491); and (ii) for *S. aureus*, NRS 14 and NRS 385.

Figure 3:
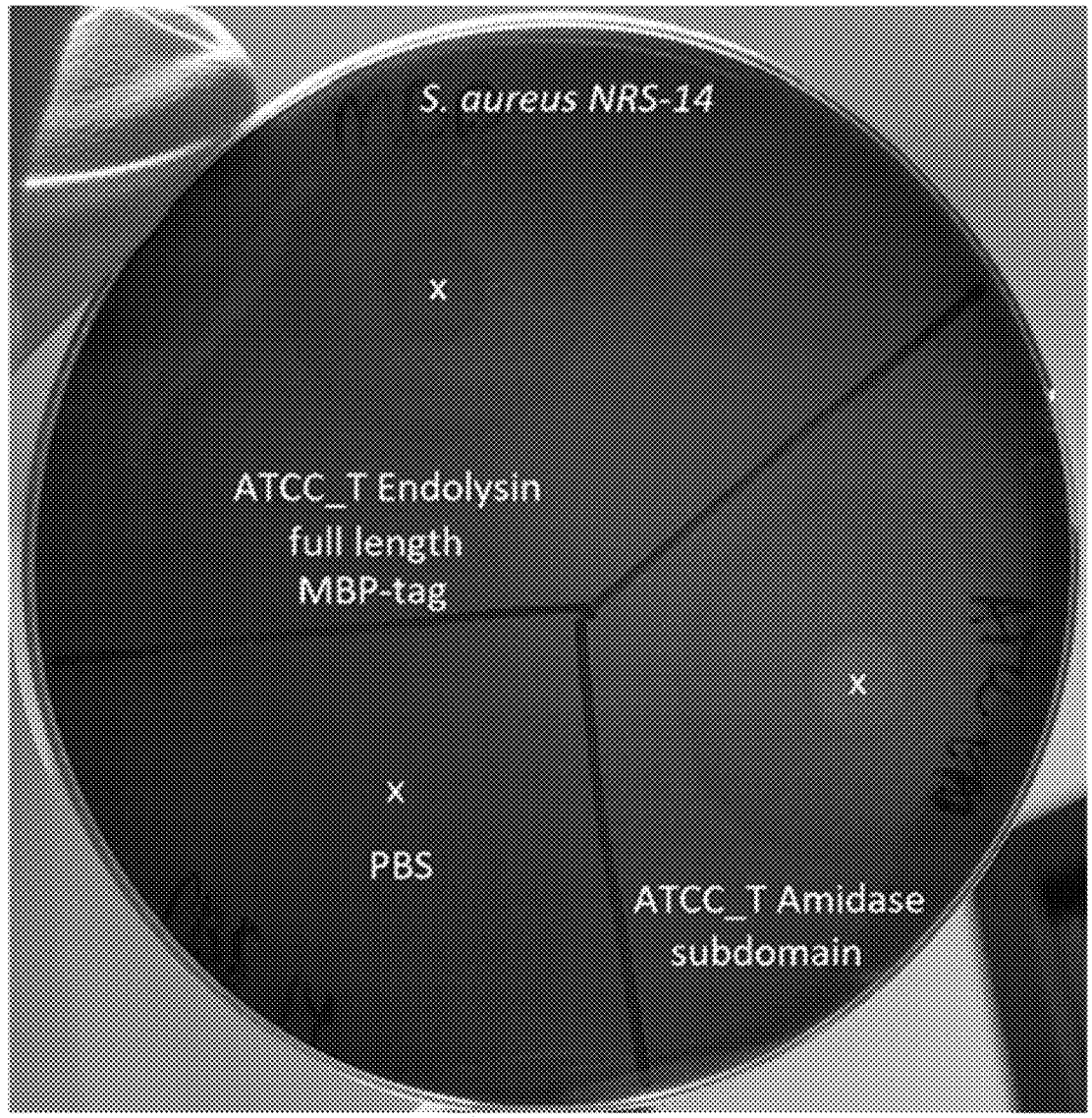
FIG. 3 is a photographic image of an agar plate on which *S. aureus* NRS-14 bacteria were exposed, in respective sectors of the plate, to (i) ATCC_T Endolysin, full length (PlyT100), with a maltose-binding protein tag (MBP-tag), (ii) ATCC_T (PlyT100) Amidase subdomain protein, and (iii) only sterile phosphate buffer solution (PBS).
Figure 4:
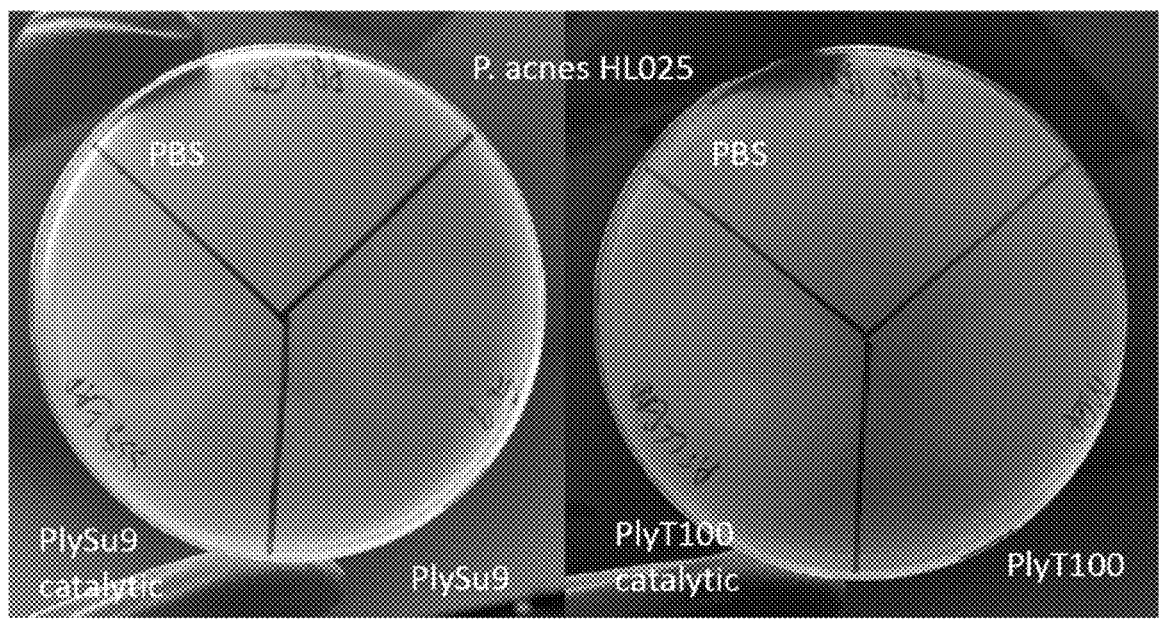
FIG. 4 is a photographic image (left image) of an agar plate on which *P. acnes* HL025 bacteria were exposed, in respective sectors of the plate, to (i) PlySu9, (ii) PlySu9 catalytic (amidase) domain, and (iii) only PBS; and a photographic image (right image) of an agar plate on which *P. acnes* HL025 bacteria were exposed, in respective sectors of the plate, to (i) PlyT100, (ii) PlyT100 catalytic (amidase) domain, and (iii) only PBS.

Exemplary plates are shown in FIG. 3, with Table 1 below summarizing the results.

TABLE 1

| Strain | PlySu9 EAD + CBD | PlySu9CAT EAD only | PlyT100 EAD + CBD | PlyT100CAT EAD only |
|---|---|---|---|---|
| *P. acnes* Gareth | ++ | ++ | ++ | ++ |
| *P. acnes* HL001 | ++ | ++ | + | ++ |
| *P. acnes* HL025 | ++ | ++ | + | ++ |
| *P. acnes* SK137 | − | − | − | + |
| *P. acnes* HL002 | + | + | + | + |
| *S. aureus* 14 | ++ | ++ | ++ | ++ |
| *S. aureus* 385 | + | ++ | ++ | ++ |

Direct killing experiments were performed by serial dilutions. The experiments showed that full-length PlyT100 effected a 2 logs killing of *P. acnes* and *S. aureus* (i.e., a 99% cidal effect), and that PlySu9 and its isolated amidase catalytic domain exhibited ~1.5 logs killing of *P. acnes* and *S. aureus* (i.e., a 95% cidal effect).

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A method of treating *P. acnes* and/or *S. aureus* infection, comprising contacting said *P. acnes* and/or *S. aureus*, or a physiological locus infected or susceptible to infection by said *P. acnes* and/or *S. aureus*, with at least one bacteriolytic agent comprising a PlyT100 endolysin comprising the sequence of SEQ ID NO: 3, or an enzymatically active amidase domain of said PlyT100 endolysin comprising the sequence of SEQ ID NO: 6.

2. The method of claim 1, wherein said bacteriolytic agent comprises said PlyT100 endolysin comprising the sequence of SEQ ID NO: 3.

3. The method of claim 1, wherein said bacteriolytic agent comprises said enzymatically active amidase domain of said PlyT100 endolysin comprising the sequence of SEQ ID NO: 6.

4. The method of claim 1, wherein said bacteriolytic agent comprises the PlyT100 endolysin consisting of SEQ ID NO:3.

5. The method of claim 1, wherein said *P. acnes* infection is an infection by at least one *P. acnes* strain selected from the group consisting of Gareth, HL001 substrain 488, HL025 substrain 500, SK137 substrain 122, and HL002 substrain 491.

6. The method of claim 1, wherein said *S. aureus* infection is an infection by *S. aureus* strain NRS 14 and/or NRS 385.

7. The method of claim 1, wherein said *S. aureus* is a methicillin-resistant *S. aureus*.

* * * * *